US009961555B2

(12) United States Patent
Canis et al.

(10) Patent No.: US 9,961,555 B2
(45) Date of Patent: *May 1, 2018

(54) METHODS, APPARATUS, AND COMPUTER PROGRAMS FOR PROVIDING A LOCK CONTROL SIGNAL FOR A MOBILE LOGISTICS DESTINATION

(71) Applicant: Volkswagen AG, Wolfsburg (DE)

(72) Inventors: Daniel Canis, Berlin (DE); Simon Karrenberg, Braunschweig (DE)

(73) Assignee: Volkswagen AG (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/656,379

(22) Filed: Jul. 21, 2017

(65) Prior Publication Data

US 2017/0325095 A1 Nov. 9, 2017

Related U.S. Application Data

(63) Continuation of application No. 15/421,892, filed on Feb. 1, 2017, now Pat. No. 9,736,695.

(30) Foreign Application Priority Data

Feb. 9, 2016 (DE) .................. 10 2016 201 941

(51) Int. Cl.
*H04W 12/08* (2009.01)
*H04W 64/00* (2009.01)

(52) U.S. Cl.
CPC ......... *H04W 12/08* (2013.01); *H04W 64/006* (2013.01)

(58) Field of Classification Search
CPC .......... G07F 11/62; H04L 67/04; H04L 67/10; H04W 12/08; H04W 4/00; H04W 4/06
See application file for complete search history.

(56) References Cited

U.S. PATENT DOCUMENTS

| 2010/0182148 | A1 | 7/2010 | Fan |
| 2012/0243686 | A1 | 9/2012 | Wesby |
| 2015/0343993 | A1 | 12/2015 | Ferrieres et al. |

FOREIGN PATENT DOCUMENTS

| DE | 1161909 T1 | 11/2002 |
| DE | 10160292 C1 | 12/2002 |

(Continued)

OTHER PUBLICATIONS

Search Report from German Patent Application No. 10 2016 201 941.4; dated Oct. 11, 2016.

*Primary Examiner* — Nizar Sivji
(74) *Attorney, Agent, or Firm* — Barnes & Thornburg LLP

(57) ABSTRACT

Methods, apparatuses and computer programs for providing a lock control signal for a mobile logistic destination including obtaining information about a delivery request, providing an authorization request for opening the mobile logistic destination, obtaining information about an authorization for opening the mobile logistic destination during the probable delivery period from the mobile device, obtaining information about a lock enquiry and delivery agent location information from a mobile device of a delivery agent for the delivery, obtaining logistic destination location information from the logistic destination, determining a delivery agent authorization for opening the mobile logistic destination, computing a delivery agent location difference between the logistic destination location information and the delivery agent location information, comparing a timestamp of the lock enquiry with the probable delivery period, determining the lock control signal for the mobile logistic destination, and providing the lock control signal for the mobile logistic destination.

21 Claims, 6 Drawing Sheets

(56) References Cited

FOREIGN PATENT DOCUMENTS

| | | |
|---|---|---|
| DE | 102005057799 A1 | 5/2007 |
| DE | 102011076638 A1 | 11/2012 |
| DE | 102011089496 A1 | 6/2013 |
| DE | 102012223152 A1 | 6/2014 |
| DE | 102012223304 A1 | 6/2014 |
| DE | 102014004673 A1 | 10/2015 |
| EP | 2313870 A1 | 4/2011 | ic
METHODS, APPARATUS, AND COMPUTER PROGRAMS FOR PROVIDING A LOCK CONTROL SIGNAL FOR A MOBILE LOGISTICS DESTINATION

PRIORITY CLAIM

This patent application is a continuation application of U.S. patent application Ser. No. 15/421,892, filed Feb. 1, 2017, which claims priority to German Patent Application No. 10 2016 201 941.4, filed 9 Feb. 2016, the disclosure of which is incorporated herein by reference in its entirety.

SUMMARY

Illustrative embodiments relate to methods, apparatuses and computer programs for providing a lock control signal for a mobile logistic destination, more precisely, but not exclusively, based on an authorization request for a mobile device of a recipient of a delivery.

BRIEF DESCRIPTION OF THE DRAWINGS

Further configurations are described in more detail below on the basis of the exemplary embodiments depicted in the drawings, which exemplary embodiments generally do not represent an overall restriction for exemplary embodiments, however. In the drawings.

DETAILED DESCRIPTION

Figure 1:
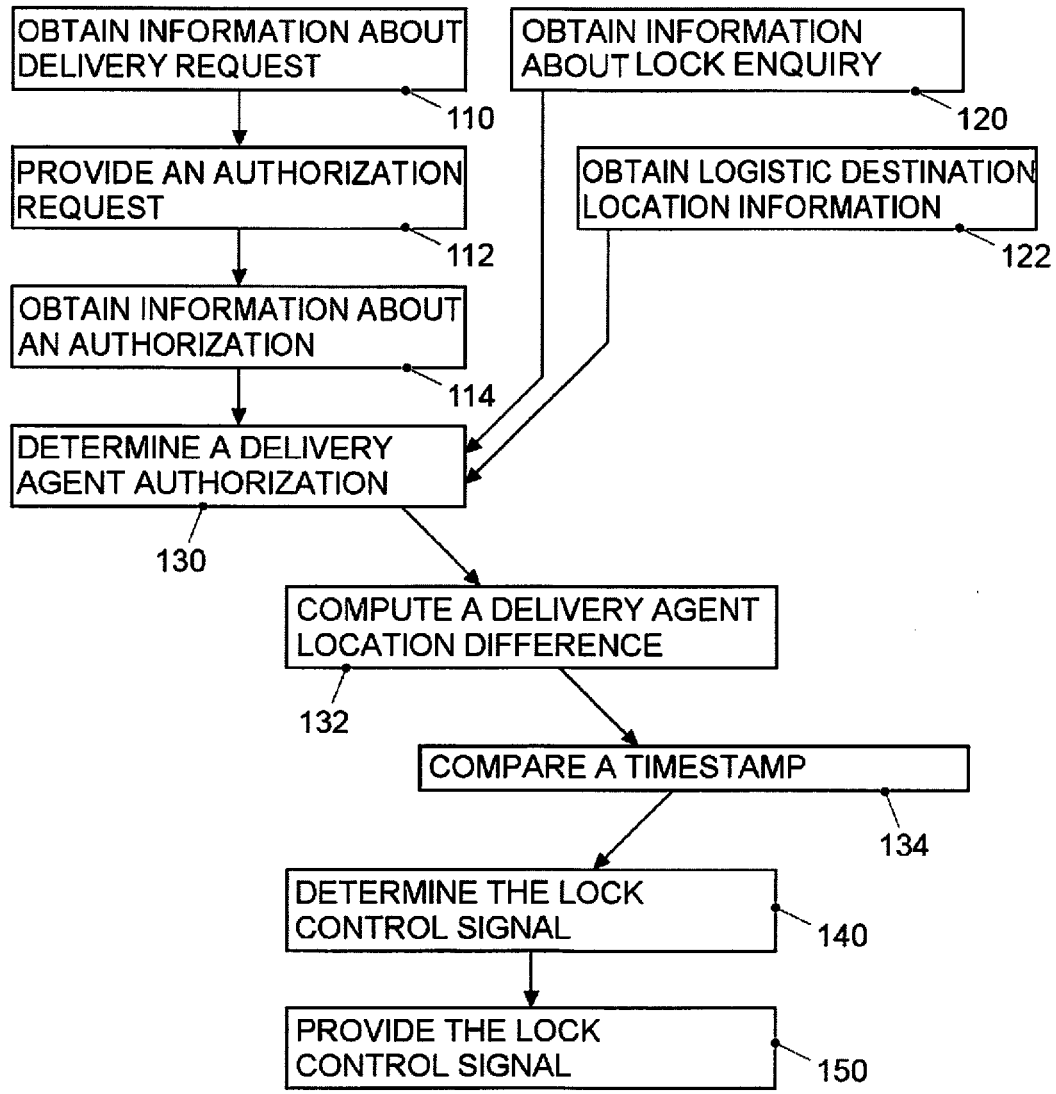
FIG. 1 illustrates a flowchart for an exemplary embodiment of a method for providing a lock control signal for a mobile logistic destination.

Mobile devices are increasingly used to perform legally binding transactions: mobile devices are used for online banking or shopping, for example, and even communication by authorities can be performed using certified mail providers, for example. An increasing proliferation of encryption increases the security of the transactions, and apparatuses for secure authentication of the users, for example, based on fingerprint scanners or iris cameras, allow frequently sufficiently secure authentication of their users.

Shopping with mail order traders, e.g., online traders, is unabatedly popular. The volume of orders with mail order traders is constantly rising. Customers value the non-time-dependent availability of the supply, inter alia, to be able to still make purchases after the shops have closed, for example, or to have bulky shopping delivered by a delivery service. At the same time, demands on receipt of the goods are rising in this case. Many customers cannot receive parcels during the day, and parcel offices for receiving parcels likewise have limited opening times in many cases and therefore negate the gain in convenience. One way of getting around this limitation is delivery to a mobile depot, for example, to the trunk of a vehicle. At the same time, access to and location of the vehicle is an infringement of the privacy and the property of the recipient.

There is therefore a need to provide secure access to the mobile logistic destination, wherein the privacy of the user and the security of the property are maintained with respect to the logistic service provider. This need is reflected by the methods, apparatuses and computer programs according to the independent claims.

Exemplary embodiments provide a method for providing a lock control signal for a mobile logistic destination, for example, a vehicle. If a logistic service provider wishes to make a delivery to the mobile logistic destination, then a customer or the logistic service provider provides information about a delivery request for a central station, for example, a computer center or a server. Based on the delivery request, a mobile device of a recipient of the delivery is provided with an authorization request that the recipient can enable for the scheduled delivery period. The user therefore provides the central station with the authorization to unlock the mobile logistic destination on a valid request from the delivery agent for unlocking the mobile logistic destination, provided that a check on the current time against the time of the authorization reveals a match and a check on the position of the delivery agent against the mobile delivery destination reveals an approximate match. If the prerequisites are in place, then the method can prompt the mobile logistic destination to be unlocked.

Exemplary embodiments provide a method for a central station for providing a lock control signal for a mobile logistic destination. The method comprises obtaining information about a delivery request. The information about the delivery request comprises information about a probable delivery period for a delivery. The method further comprises providing an authorization request for opening the mobile logistic destination during a delivery period for a mobile device of a recipient of the delivery, based on the information about the delivery request and the information about the probable delivery period. The method further comprises obtaining information about an authorization for opening the mobile logistic destination during the probable delivery period from the mobile device. The method further comprises obtaining information about a lock enquiry and delivery agent location information from a mobile device of a delivery agent for the delivery. The method further comprises obtaining logistic destination location information from the logistic destination. The method further comprises determining a delivery agent authorization for opening the mobile logistic destination based on the information about the lock enquiry and based on the information about the authorization. The method further comprises computing a delivery agent location difference between the logistic destination location information and the delivery agent location information. The method further comprises comparing a timestamp of the lock enquiry with the probable delivery period. The method further comprises determining the lock control signal for the mobile logistic destination based on the authorization of the delivery agent, based on the delivery agent location difference and based on the comparison of the timestamp with the probable delivery period. The method further comprises providing the lock control signal for the mobile logistic destination if the delivery agent is authorized to open the mobile logistic destination, if the delivery agent location difference satisfies a distance condition and if the timestamp is within the probable delivery period. Providing the authorization request for the mobile device of the recipient allows an authorization for accessing the mobile logistic destination to be issued explicitly, which allows the responsibility to be transferred to the recipient. The use of further criteria such as, e.g., the position of the delivery agent and the time of day can further increase security.

In at least some exemplary embodiments, the information about the authorization is obtained before the information about the lock enquiry is obtained. Issuing the authorization before a delivery attempt allows grant of authorization and delivery attempt to be decoupled in time, which means that a prompt reaction from the recipient is not necessary during delivery.

In some exemplary embodiments, the delivery agent location information can correspond to coordinates from a satellite-based positioning system. Computing the delivery agent location difference can be based on a comparison of the coordinates of the delivery agent location information with coordinates of the delivery destination location information. The use of coordinates from the satellite-based positioning system, for example, the global positioning system (GPS), allows a programmatic check on a presence of the delivery agent at the delivery location without any user interaction.

In some exemplary embodiments, the method can further comprise obtaining information about a revocation of the authorization from the mobile device of the recipient. The information about the revocation can indicate that the user revokes the authorization for opening the mobile logistic destination during the probable delivery period. Determining the lock control signal can further be based on the information about the revocation. Alternatively or additionally, it is possible for providing not to be carried out if the authorization is revoked by the information about the revocation. The possibility of revocation allows the delivery attempt to be aborted by the recipient, for example, if the mobile logistic destination is not at the scheduled location or because the recipient no longer wants the delivery at the mobile logistic destination.

Exemplary embodiments further provide a method for a mobile device. The method comprises obtaining an authorization request for opening a mobile logistic destination at the delivery time. The authorization request is based on information about a delivery request and on information about a probable delivery period for the delivery. The method further comprises providing a notification about the authorization request for a user of the mobile device via an output module. The method further comprises obtaining a piece of information about a response from the user of the mobile device to the notification about the authorization request from an input module. The response indicates whether or not the user consents to the authorization request. The method further comprises determining information about an authorization for opening the mobile logistic destination during the probable delivery period based on the authorization request and based on the information about the response. The method further comprises providing the information about the authorization. The response to the authorization request by the mobile device of the recipient allows an authorization for accessing the mobile logistic destination to be issued explicitly, which allows the responsibility to be transferred to the recipient.

In some exemplary embodiments, the output module can correspond to a screen and the input module can correspond to a touch sensitive sensor. The response can correspond to a position of a slide control in a visual depiction of the slide control. The use of the screen allows convenient presentation of a multiplicity of pieces of information. The use of the touch sensitive sensor allows accurate and intuitive operator control. Alternatively or additionally, the input module can comprise a microphone. The information about the response can comprise a recording of a voice command. Alternatively or additionally, the input module can comprise a motion sensor. The information about the response can correspond to a prescribed movement of the motion sensor. Use of different input modules can allow the input to be matched to a situation of the recipient.

In some exemplary embodiments, the notification about the authorization request further comprises a notification about an authentication request for the user. The information about the response further comprises information about an authentication of the user, for example. Determining the information about the authorization can further be based on the authentication of the user. An authentication of the user, for example, by means of a password, a fingerprint scan or a retinal scan, can further increase security of the transaction.

In at least some exemplary embodiments, the method further comprises obtaining information about a revocation of the authorization from the input module. The information about the revocation can indicate that the user revokes the authorization for opening the mobile logistic destination during the probable delivery period. The method can further comprise providing the information about the revocation of the authorization. The possibility of revocation allows the delivery attempt to be aborted by the recipient, for example, if the mobile logistic destination is not at the scheduled location or because the recipient no longer wants the delivery at the mobile logistic destination.

Exemplary embodiments further provide a program having a program code for performing at least one of the methods when the program code is executed on a computer, a processor, a control module or a programmable hardware component.

Exemplary embodiments furthermore provide an apparatus for a central station for providing a lock control signal for a mobile logistic destination. The apparatus comprises at least one interface, designed for communication with a mobile device of a recipient of a delivery, for communication with the mobile logistic destination and for communication with a mobile device of a delivery agent for the delivery. The apparatus further comprises a control module, designed for obtaining information about a delivery request via the at least one interface. The information about the delivery request comprises information about a probable delivery period for the delivery. The control module is further designed for providing an authorization request for opening the mobile logistic destination during a delivery period for the mobile device of the recipient of the delivery via the at least one interface based on the information about the delivery request and the information about the probable delivery period. The control module is further designed for obtaining information about an authorization for opening the mobile logistic destination during the probable delivery period from the mobile device via the at least one interface. The control module is further designed for obtaining information about a lock enquiry and delivery agent location information from the mobile device of the delivery agent for the delivery via the at least one interface. The control module is further designed for obtaining logistic destination location information from the logistic destination via the at least one interface. The control module is further designed for determining a delivery agent authorization for opening the mobile logistic destination based on the information about the lock enquiry and based on the information about the authorization. The control module is further designed for computing a delivery agent location difference between the logistic destination location information and the delivery agent location information. The control module is further designed for comparing a timestamp of the lock enquiry with the probable delivery period. The control module is further designed for determining the lock control signal for the mobile logistic destination based on the authorization of the delivery agent, based on the delivery agent location difference and based on the comparison of the timestamp with the probable delivery period. The control module is further designed for providing the lock control signal for the mobile logistic destination via the at least one interface if the delivery agent is authorized to open the mobile logistic destination, if the delivery agent location difference satisfies a distance condition and if the timestamp is within the probable delivery period.

Exemplary embodiments further provide an apparatus for a mobile device. The apparatus comprises at least one interface, designed for communication with a central station. The apparatus further comprises a control module, designed for obtaining an authorization request for opening a mobile logistic destination during a delivery period via the at least one interface. The authorization request is based on information about a delivery request and on information about a probable delivery period for the delivery. The control module is further designed for providing a notification about the authorization request for a user of the mobile device via an output module. The control module is further designed for obtaining a piece of information about a response from the user of the mobile device to the notification about the authorization request from an input module. The response indicates whether or not the user consents to the authorization request. The control module is further designed for determining information about an authorization for opening the mobile logistic destination during the probable delivery period based on the authorization request and based on the information about the response. The control module is further designed for providing the information about the authorization via the at least one interface.

Exemplary embodiments further provide a mobile device comprising the apparatus for the mobile device. Exemplary embodiments further provide the central station comprising the apparatus for the central station. Exemplary embodiments further provide a system, comprising the central station with the apparatus for the central station and a mobile device comprising the apparatus for the mobile device. The system can further comprise the mobile logistic destination and/or the mobile device of the delivery agent.

Various exemplary embodiments will now be described in more detail with reference to the accompanying drawings, in which a few exemplary embodiments are depicted. In the figures, the thickness dimensions of lines, layers and/or regions may be depicted in an exaggerated manner for the sake of clarity.

In the below description of the appended figures, which show only some exemplary embodiments by way of example, like reference symbols can denote like or comparable components. Further, combinatory reference symbols can be used for components and objects that occur repeatedly in an exemplary embodiment or in a drawing, but are described jointly with regard to one or more features. Components or objects that are described using like or combinatory reference symbols can be embodied identically, but possibly also differently, in respect of single, multiple or all features, for example, their dimensions, unless the description explicitly or implicitly reveals otherwise.

Although exemplary embodiments can be modified and altered in various ways, exemplary embodiments are depicted as examples in the figures and are described comprehensively herein. However, it should be clarified that there is no intention to restrict exemplary embodiments to the form respectively disclosed, but rather that exemplary embodiments are intended to cover all functional and/or structural modifications, equivalents and alternatives that lie within the scope of the disclosed embodiments. Like reference symbols denote like or similar elements throughout the description of the figures.

It is noted that one element denoted as "connected" or "coupled" to another element can be directly connected or coupled to the other element or that intervening elements can be present. By contrast, if one element is denoted as "directly connected" or "directly coupled" to another element, then no intervening elements are present. Other terms used to describe the relationship between elements should be interpreted in a similar manner (e.g., "between" vis à vis "directly therebetween", "adjacent" vis à vis "directly adjacent", etc.).

The terminology used herein serves only to describe specific exemplary embodiments and is not intended to restrict the exemplary embodiments. As used herein, the singular forms "a" and "the" are also intended to include the plural forms, unless clearly indicated otherwise by the context. Further, it should be clarified that the expressions such as, e.g., "comprises", "comprising", "has" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they had the meaning that is consistent with their meaning in the context of the relevant art, and should not be interpreted in an idealized or excessively formal sense, unless this is expressly defined herein.

Figure 2:
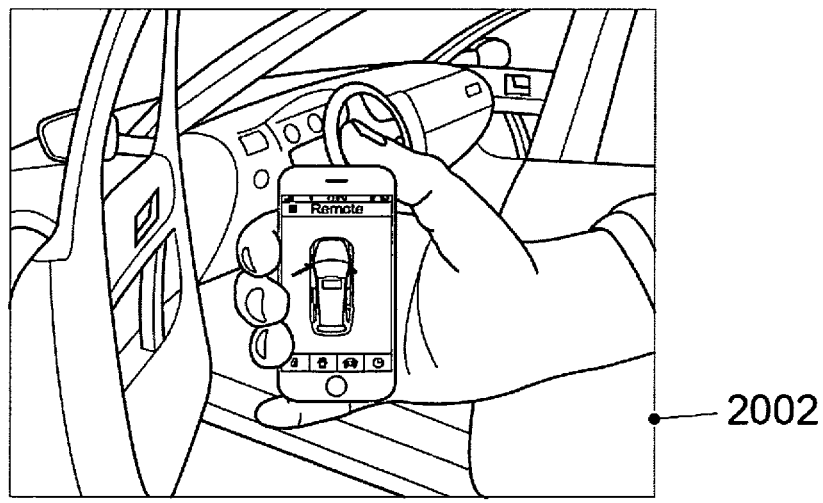
FIG. 2 shows an example of a vehicle being linked to an application on a mobile telephone.
Figure 2:
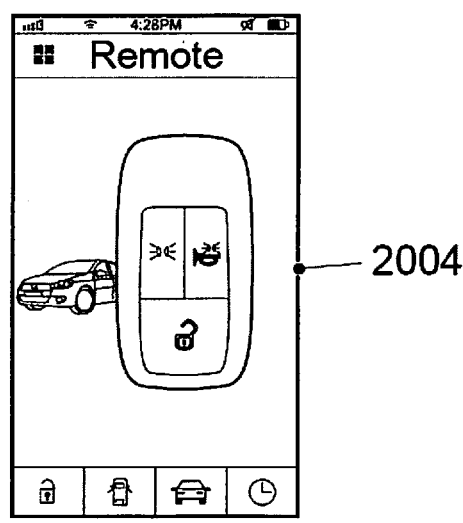

The linking of automobiles to the mobile radio network and the Internet allows vehicle functions to be triggered or controlled remotely via mobile applications. These remote accesses to vehicle functions allow numerous new services to be provided. Such a function, in exemplary embodiments, is remote unlocking and locking of doors, hatches and tops of a networked vehicle, for example, for the purpose of deliveries/collections to the trunk. FIG. 2 shows examples by way of illustration. 2002 shows, by way of example, an application for a mobile telephone that can be used to indicate whether doors of a vehicle are open. The application can, by way of example, further allow the doors to be opened, a flashing warning functionality to be triggered or a horn to be operated, as shown in 2004. To this end, by way of example, a third party can be allowed one-off, temporally and spatially restricted access to the interior of the vehicle.

Remote unlocking of a vehicle can be effected on the basis of a mobile online service function "Unlock Door", for example, and locking can accordingly be effected using the "Lock Door" function. These functions are available at least to some extent to customers from vehicles having mobile online services. An appropriate mobile application can be used by a customer registered as the main user of the vehicle to perform this function regardless of distance. The request for unlocking the vehicle is in this case sent by the customer, using a mobile application, to a central unit that, directly after a legitimation check, delivers an encrypted control command to a reception module of the associated vehicle. The vehicle electronics convert this encrypted command into the respective control signal. Opening and locking are each effected under the responsibility of the customer.

If the vehicle needs to be opened to a third party (e.g., the parcel delivery agent) for the purpose of delivering goods or a parcel, then the vehicle owner would have to trigger unlocking of the vehicle using the mobile application himself when the delivery agent arrives at the vehicle. Since this would probably result in waiting times for the delivery agent, this process is not very suitable for everyday use and provides little improvement over a delivery attempt to the home address of a customer.

Further, there are frequently no contractual relationships between operators of online services for vehicles (e.g., manufacturers) and logistics companies. As such, vehicle manufacturers are frequently not authorized to perform automated and shipment-independent remote unlocking of the vehicle. The forwarding of location data for a vehicle for the purpose of a delivery may likewise not be possible without appropriate authorization by the vehicle keeper.

Against the background of the problems described, a method is described in which, in at least some exemplary embodiments, an associated vehicle (main) user issues the central unit with an unlock instruction that is valid for a delivery process in the future and results in the vehicle actually being unlocked only if particular conditions are satisfied. At the center of the method is an authorization request for the user and grantable authorization by the user, and in some exemplary embodiments the method also comprises a temporary restricted indication of the position of the vehicle to a third party and also optional activation of the hazard warning lights.

In an exemplary embodiment by way of example, it is first of all assumed that the ordering customer and vehicle user are the same person. The customer orders goods from a trader and specifies his vehicle as the desired delivery address. The delivery address cited may be the probable location of the vehicle on the day of the delivery, for example. The probable day of the delivery is provided by the trader, for example, after querying an interface of a logistic service provider.

By way of example, this first data record of the customer contains:
 a. The name of the ordering customer
 b. The vehicle identifier of the vehicle to which the delivery is to be made (license plate and/or vehicle ID)
 c. Location of the vehicle as a postal address (street and/or zip code)
 d. Time window (e.g., 7.13.2015, 12:00 to 15:00 hours) during which the vehicle will be at the specified location (see c.).

By way of example, a delivery order from the trader is sent to a logistic service provider. In this case, the trader generates a second data record that may be comprised in a piece of information about a delivery request and that can comprise the following details:
 a. Order number
 b. Details from the first data record In this case, the logistic service provider has no contractual relationship with the manufacturer of the vehicle, for example. Contractual relationships are possible between the logistic service provider and the recipient customer, e.g., a storage order for the logistic service provider.

On the basis of this delivery order, the logistic service provider can provide an access prerequest (or information about a lock enquiry) via an interface of the central unit. By way of example, the central unit can correspond to a central unit 100 from FIG. 1. This is accomplished by generating a third data record, for example, consisting of:
 a. Shipment number
 b. Details from the second data record The central unit can take this lock enquiry as a basis for providing an authorization request that is sent to the associated vehicle main user. In this case, the shipment number included (comprised in the information about the delivery request) can assist the user in identifying the shipment. The user can be asked to unlock his vehicle after a delay for the purpose of delivering the specified shipment and, by way of example, to permit further accesses (vehicle locating, flashing, locking) to the vehicle.

The recipient can obtain the authorization request, by way of example, on a mobile device, for example, a mobile application (also called an app) on a smartphone, for example, together with information about the delivery he desires to his vehicle. The data of the request can match his data specified on ordering (first data record), and, by way of example, comprise the vehicle identifier, the day of the delivery, the time window, the zip code, the street and/or possibly the house number. Optionally, a shipment number may be comprised, which has been allocated by the dealer or the logistic service provider and can identify the delivery.

Within this mobile application, the vehicle main user can now trigger "delayed remote unlocking", for example, by moving a graphical slide element to the "Unlock vehicle" state. This conversion of the slide element from "Do not unlock vehicle" to "Unlock vehicle (on MM.DD.YY)" may be accompanied by a further security mechanism, such as, e.g., the requesting of a PIN, requesting of a fingerprint scan or retinal scan.

Figure 3:
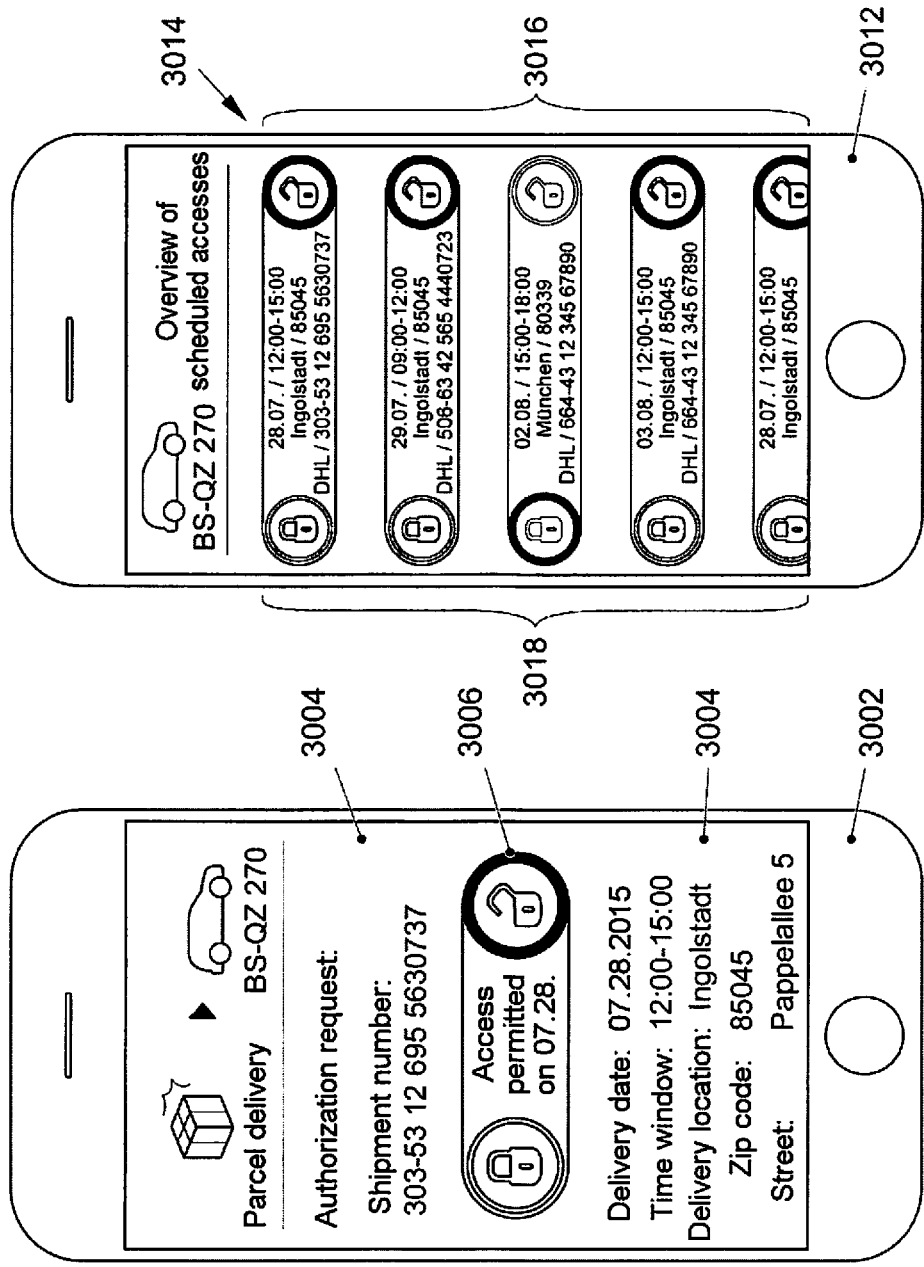
FIG. 3 shows an exemplary embodiment by way of example.

FIG. 3 shows an exemplary embodiment by way of example. 3002 shows a display of the authorization request, which comprises information about the delivery request 3004 and a slide control 3006 for granting the authorization. In this case, the information about the delivery request 3004 comprises, by way of example, the shipment number, the date, the time of the delivery for which the authorization is intended to be granted, the delivery location, the zip code and the address. FIG. 3, 3012 shows an overview of deliveries/scheduled accesses 3014 to the vehicle with the information about the delivery request, with a visual indication of whether authorization has been granted 3016 or not 3018.

This active movement of the slide element allows the vehicle main user, by way of example, to grant the authorization for delivery and to explicitly place the order for performance of the unlocking function or forwarding vehicle-related data with the manufacturer, for example, if the following constraints are satisfied. These constraints may be based on the third data record, for example.

The consent of the customer can be stored as information about the authorization in the central station. A corresponding fourth data record can comprise, by way of example, the
 a. Consent of the customer
 b. Details from the third data record,
or can refer thereto. The delivery agent can be informed about the consent of the customer and, in some exemplary embodiments, obtain the fourth data record at least in part.

In at least some exemplary embodiments, the authorization can be revoked or adapted by the customer. The revocation or adaptations can be effected by the mobile application or, by way of example, a web portal. Adaptation can involve the time window and the vehicle address being changed, for example.

On the day of the delivery, the delivery agent can use his mobile terminal and the central unit of the logistics company to communicate with the central unit and request the relevant information and functions of the associated vehicle. In this case, in at least some exemplary embodiments, the prerequisites cited in the fourth data record that have been arranged with the deliverer and confirmed by the customer must be satisfied. These are, by way of example a. unlocking takes place on the arranged date
b. unlocking takes place within the arranged time window
c. the vehicle is within the arranged zip code area or within a permissible radius (e.g., 1 km)
d. the delivery agent is demonstrably in proximity to the vehicle.

After a successfully concluded delivery, the authorization granted can expire, for example, and no further information can be requested.

Figure 1A:
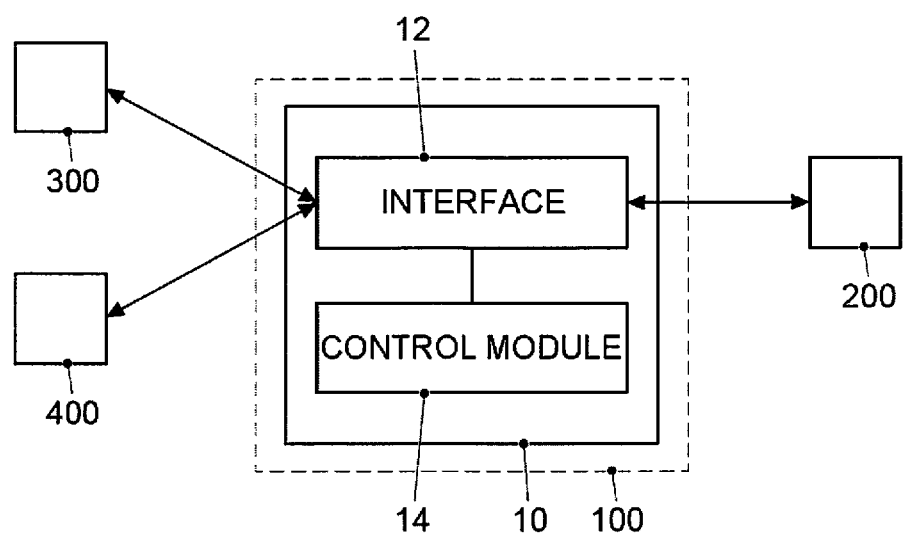
FIG. 1a illustrates a block diagram for an exemplary embodiment of an apparatus for providing a lock control signal for a mobile logistic destination.

FIG. 1 illustrates a flowchart for an exemplary embodiment of a method for a central station 100 for providing a lock control signal for a mobile logistic destination 300. FIG. 1a illustrates a block diagram for an exemplary embodiment of an apparatus 10 for the central station 100 that is designed to perform the method. In at least some exemplary embodiments, the central station and/or the apparatus 10 are located outside the logistic destination 300 and are designed to communicate with the mobile logistic destination via a radio network. The apparatus 10 comprises at least one interface 12, designed for communication with a mobile device 200 of a recipient of a delivery, for communication with the mobile logistic destination 300 and for communication with a mobile device 400 of a delivery agent for the delivery. The apparatus further comprises a control module 14 that is coupled to the at least one interface and that is designed to perform the method operations, for example, method operations at 110-150. The control module 14 is designed to perform the communication with the mobile logistic destination 300, with the mobile device 400 and the mobile device 200 via the at least one interface, for example, in method operations at 110, 112, 114, 120, 122 and 150.

Figure 4:
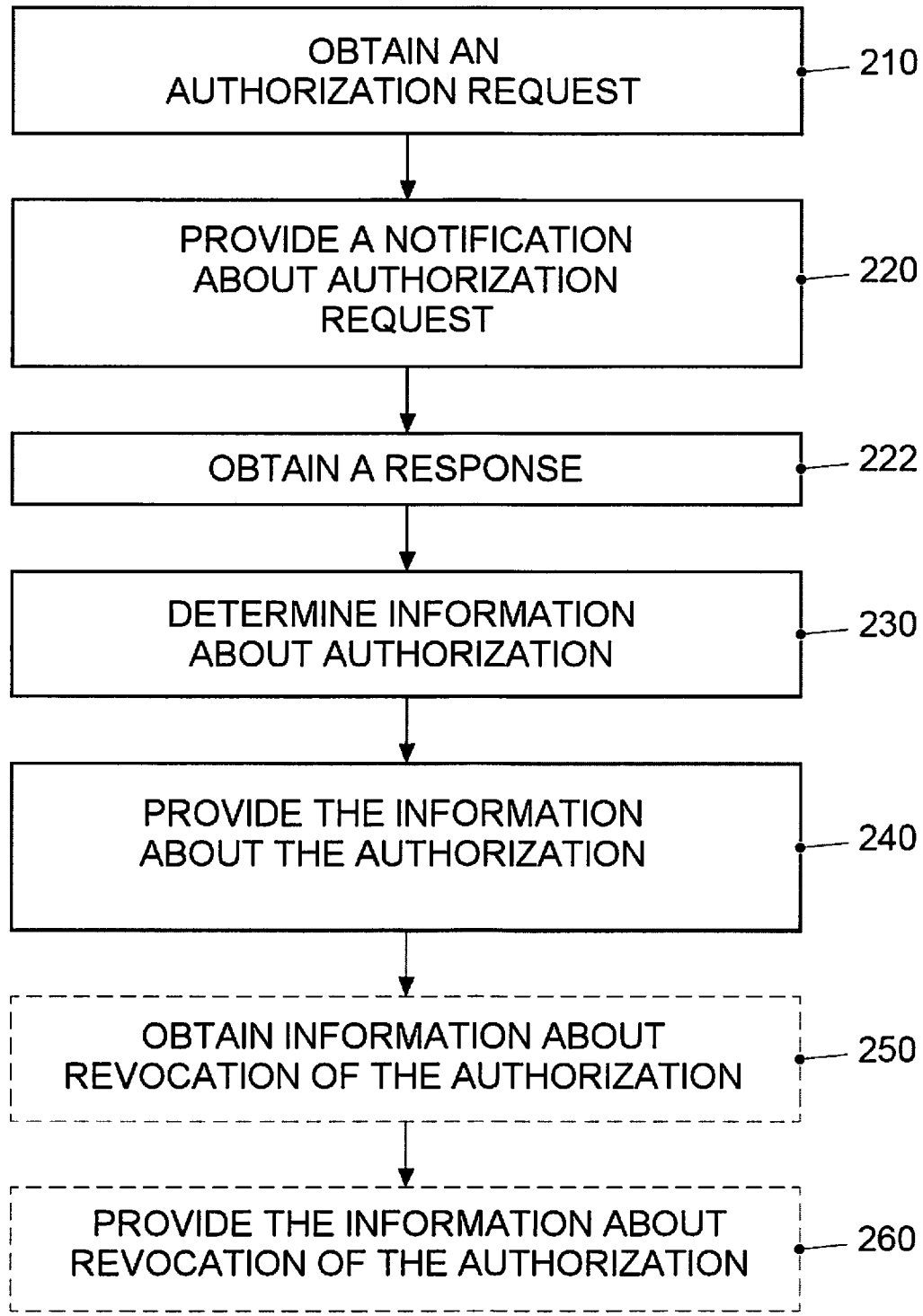
FIG. 4 illustrates a flowchart for an exemplary embodiment of a method of a mobile device.
Figure 4A:
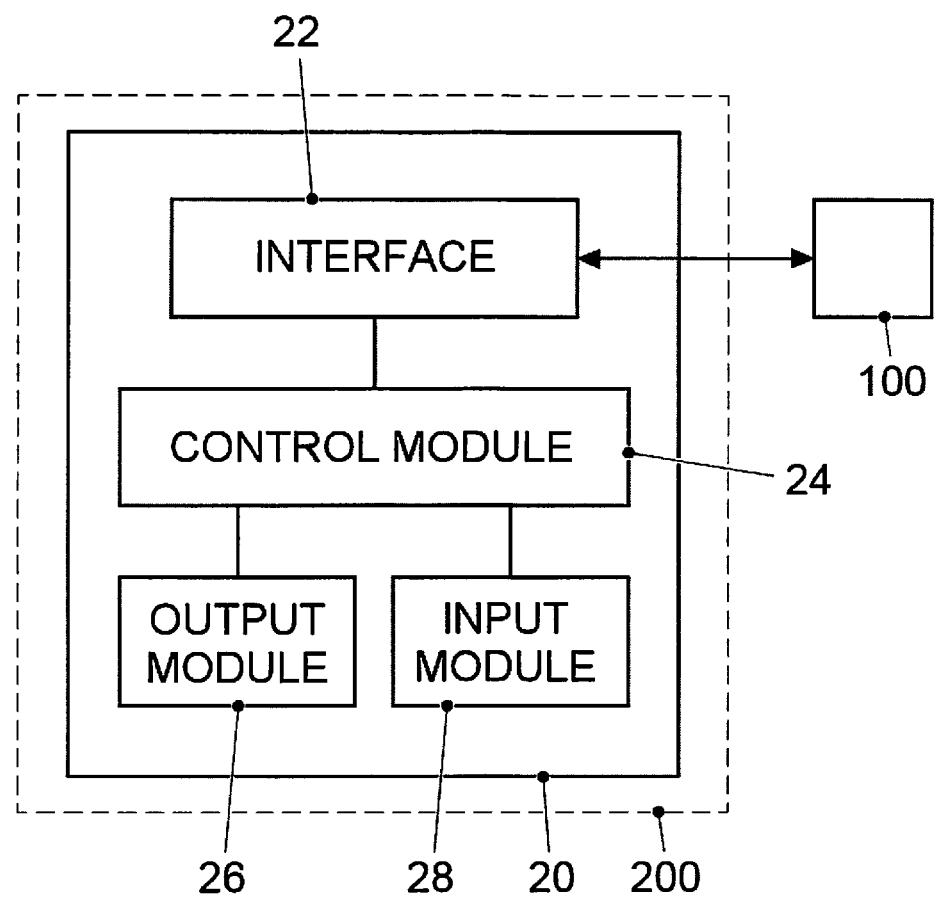
FIG. 4a illustrates a block diagram for an exemplary embodiment of an apparatus for the mobile device.

The at least one interface 12, and/or at least one interface 22 from FIG. 4a, can correspond, by way of example, to one or more inputs and/or one or more outputs for receiving and/or transmitting information, for example, in digital bit values, based on a code, within a module, between modules or between modules of different entities. In at least some exemplary embodiments, the central station 100 may be designed to use the interface 12 to communicate with the mobile device 200, the logistic destination 300 and/or the mobile device 400 via the radio network, which can correspond to a cellular mobile radio system, for example. The mobile radio system can correspond, by way of example, to one of the mobile radio systems that are standardized by relevant standardization committees, such as, e.g., the 3rd Generation Partnership Project (3GPP) group. By way of example, these include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication System (UMTS), Long Term Evolution (LTE) or LTE-Advanced (LTE-A), or mobile radio systems of other standards, such as, e.g., Worldwide Interoperability for Microwave Access (WIMAX), IEEE802.16 or Wireless Local Area Network (WLAN), IEEE802.11, and also generally a system that is based on a Time Division Multiple Access (TDMA) method, Frequency Division Multiple Access (FDMA) method, Code Division Multiple Access (CDMA) method, Orthogonal Frequency Division Multiple Access (OFDMA) method or another technology or multiple access method. In the text below, the terms mobile radio system, mobile radio network, mobile communication system and mobile radio network are used synonymously.

In exemplary embodiments, the control device or the control module 14, and/or a control module 24 from FIG. 4a, can correspond to any controller or processor or to a programmable hardware component. By way of example, the control module 14; 24 may also be realized as software that is programmed for an appropriate hardware component. In this respect, the control module 14; 24 may be implemented as programmable hardware with appropriately adapted software. In this case, any processors, such as Digital Signal Processors (DSPs), can be used. Exemplary embodiments are not restricted to one particular type of processor in this case. Any processors or multiple processors are conceivable for implementing the control module 14; 24.

In at least some exemplary embodiments, the central station 100 can correspond to a central control device, a central computation station, a server, a group of servers or a distributed server service.

The lock control signal can correspond, by way of example, to a digital signal, based on data packets and/or based on a circuit switching method, and can comprise control information about unlocking, locking and/or requesting of a locking status. In some exemplary embodiments, the lock control signal can be based on an encryption and/or a digital signature for authentication to the mobile logistic destination 300. The lock control signal can comprise at least one element from the group of information about the unlocking of a lock of the mobile logistic destination 300, information about the locking of the lock of the mobile logistic destination 300 and/or information about the control of the lock of the mobile logistic destination 300.

In at least some exemplary embodiments, the mobile logistic destination 300 can correspond to a vehicle, a trunk of a vehicle or a mobile logistic depot. In at least some exemplary embodiments, the vehicle can correspond, by way of example, to a land vehicle, a watercraft, an aircraft, a rail vehicle, a road vehicle, an automobile, an all-terrain vehicle, a motor vehicle or a truck.

The method comprises obtaining 110 information about a delivery request. The information about the delivery request comprises information about a probable delivery period for a delivery.

In some exemplary embodiments, the information about the delivery request can be provided by a vending system or a logistic service provider. In at least some exemplary embodiments, the information about the delivery request can further comprise at least one element from the group of information about the delivery content, information about a recipient, information about a delivery identifier, information about a delivery area, information about a delivery address and information about a sender.

The method further comprises providing 112 an authorization request for opening the mobile logistic destination during a delivery period for the mobile device 200 of the recipient of the delivery, based on the information about the delivery request and the information about the probable delivery period. In at least some exemplary embodiments, the authorization request can comprise the information about the delivery request and the information about the probable delivery period. The authorization request can further comprise information about the delivery, for example, information about a sender, a delivery content, a delivery identifier, a destination address or a destination area. In at least some exemplary embodiments, the authorization request can correspond to one or more data packets, which may be encrypted and/or digitally signed.

The method further comprises obtaining 114 information about an authorization for opening the mobile logistic destination during the probable delivery period from the mobile device 200. The obtaining 114 may be a reaction to providing 112 the authorization request, for example. The information about the authorization can further comprise, by way of example, information about the delivery identifier, information about the recipient and/or information about the probable delivery period for which the authorization has been granted. In at least some exemplary embodiments, the information about the authorization can correspond to one or more data packets, which may be encrypted and/or digitally signed.

The method further comprises obtaining 120 information about a lock enquiry and delivery agent location information from the mobile device 400 of the delivery agent for the delivery. The delivery agent location information can comprise the location of the mobile logistic destination. In at least some exemplary embodiments, the information about the lock enquiry can be based on the information about the delivery request and can comprise an authentication code that can be associated with an order, for example, the delivery request. In some exemplary embodiments, the information about the lock enquiry can comprise a digital signature. In at least some exemplary embodiments, the information about the lock enquiry can comprise an unlock request or a lock request.

In at least some exemplary embodiments, the information about the authorization can be obtained 114 before the information about the lock enquiry is obtained 120. By way of example, the information about the authorization can relate to a probable delivery period that is in the future. The obtaining 120 may be restricted to the probable delivery period, for example. By way of example, the obtaining 120 can take place during the probable delivery period; if the mobile device 400 provides the information about the lock enquiry at another time, then the control module 14 may be designed to reject the information about the lock enquiry or to accept it with negative feedback.

The method further comprises obtaining 122 logistic destination location information from the mobile logistic destination 300. In at least some exemplary embodiments, the logistic destination location information can comprise the location of the mobile logistic destination. The logistic destination location information and the delivery agent location information can comprise, by way of example, GPS coordinates or geographical coordinates and be based on a Global Positioning System (GPS) and/or on locating using mobile radio data.

The method further comprises determining 130 a delivery agent authorization for opening the mobile logistic destination 300 based on the information about the lock enquiry and based on the information about the authorization. The determining 130 can comprise, by way of example, checking whether there is an authorization from the recipient for the delivery to which the lock enquiry relates, or whether there is a delivery request for the mobile logistic destination 300. In at least some exemplary embodiments, the delivery request can further comprise a piece of information about a delivery location, for example, a zip code area or an address, and the determining 130 can further comprise computing whether the logistic destination location information is within the delivery location or within a radius around the delivery location.

The method further comprises computing 132 a delivery agent location difference between the logistic destination location information and the delivery agent location information. The delivery agent location difference can correspond, by way of example, to a spatial difference between the delivery agent location information and the logistic destination location information, for example, a physical distance between the pieces of location information. The computing 132 can be based, by way of example, on a trigonometric function, or can be based on a digital roadmap, for example, the delivery agent location difference being able to correspond to a distance between the mobile logistic destination 200 and the mobile device of the delivery agent 400.

In some exemplary embodiments, the delivery agent location information can correspond to coordinates from a satellite-based positioning system. Computing 132 the delivery agent location difference can be based, by way of example, on a comparison of the coordinates of the delivery agent location information with coordinates of the delivery destination location information.

The method further comprises comparing 134 a timestamp of the lock enquiry with the probable delivery period. Comparing 134 the timestamp can comprise, by way of example, checking whether the timestamp of the lock enquiry is within the probable delivery period, or within a courtesy period around the probable delivery period. In at least some exemplary embodiments, the timestamp may be comprised in the information about the lock enquiry. Alternatively or additionally, the timestamp can be based on or correspond to a time of the obtaining 120.

The method further comprises determining 140 the lock control signal for the mobile logistic destination 300 based on the delivery agent authorization, based on the delivery agent location difference and based on the comparison 124 of the timestamp with the probable delivery period. In at least some exemplary embodiments, the determining 140 can comprise checking whether the determining 130 results in the delivery agent authorization being present, whether the computing 132 results in the delivery agent location difference being below a threshold value (for example, 2 m, 5 m, 10 m, 15 m, 20 m or 25 m) and/or the timestamp being within the probable delivery time. The determining 140 can further comprise computing and/or encrypting a data packet that contains instructions to unlock or lock a lock of the mobile logistic destination 300 once.

The method further comprises providing 150 the lock control signal for the mobile logistic destination 300 if the delivery agent is authorized to open the mobile logistic destination, if the delivery agent location difference satisfies a distance condition and if the timestamp is within the probable delivery period. The distance condition can correspond, by way of example, to a distance threshold value, for example, 2 m, 5 m, 10 m, 15 m, 20 m or 25 m, based on a geometric distance or a course distance, or that the mobile device 400 of the delivery agent is in the same street as the mobile logistic destination 300 and/or that the mobile device 400 is in visual range of the mobile logistic destination 300.

In some exemplary embodiments, the method can further comprise obtaining information about the activation of a vehicle function from the mobile device 400. The vehicle function can comprise, by way of example, the activation of hazard warning lights. The method can further comprise determining a control signal for the mobile logistic destination, for the purpose of controlling the vehicle function. A prerequisite may be, by way of example, that a timestamp of the information about the activation of the vehicle function is within the probable delivery period or within a lead time, for example, 3 h, 1 h, 30 min or 15 min before the probable delivery period. A further prerequisite may be that the mobile device 400 of the delivery agent is within a radius around the mobile logistic destination 300.

In some exemplary embodiments, the method can further comprise providing the logistic destination location information for the mobile device 400 of the delivery agent, for example, when the mobile logistic destination and the mobile device are within a radius or within a specified geographical area, for example, a zip code area, a district or a street, and/or when a current time is within the probable delivery time or within a lead time before the delivery time.

In some exemplary embodiments, the method can further comprise obtaining information about a revocation of the authorization from the mobile device 200 of the recipient. The information about the revocation can indicate that the user revokes the authorization for opening the mobile logistic destination during the probable delivery period. The determining 140 can further be based on the information about the revocation. Alternatively or additionally, it is possible for the providing 150 not to be performed if the authorization is revoked by the information about the revocation. In at least some exemplary embodiments, the information about the revocation of the authorization can further comprise information about an adapted authorization that replaces the previous information about the authorization. The method can further comprise replacing the information about the authorization based on the information about the adapted authorization. By way of example, the information about the adapted authorization can comprise an adapted delivery location or an adapted probable delivery period.

FIG. 4 illustrates a flowchart for an exemplary embodiment of a method for a mobile device 200. FIG. 4a illustrates a block diagram for an exemplary embodiment of an apparatus 20 for the mobile device 200, designed for performing the method. The apparatus 20 comprises the at least one interface 22, designed for communication with the central station 100, and the control module 24, which is coupled to the at least one interface 22. The control module 24 is designed for performing the method operations, for example, method operations at 210-260. The mobile device 200, and/or the mobile device 400, can correspond, by way of example, to a portable computer system, for example, to a mobile telephone, a smartphone, a programmable watch (also called a smartwatch), a Personal Digital Assistant (PDA), a tablet computer, a mobile computer, a notebook computer, a laptop computer or a mobile computer system.

The method comprises obtaining 210 an authorization request for opening a mobile logistic destination 300 at the delivery time. The authorization request is based on information about a delivery request and on information about a probable delivery period for the delivery. The control module 24 is designed for obtaining 210 via the at least one interface 22. The obtaining 210 can correspond to obtaining the authorization request from the central station 100.

The method further comprises providing 220 a notification about the authorization request for a user of the mobile device 200 via an output module. The output module, for example, an output module 26 of the apparatus 20, which output module is coupled to the control module 24, can correspond, by way of example, to a screen, a touch sensitive screen (also called a touch screen), a loudspeaker or a tactile output module, for example, on a vibration or Braille basis. The notification about the authorization request can correspond, by way of example, to a display of an overview (such as 3002 and 3004 in FIG. 3), a linguistic output of a text or a tactile representation of the authorization request, and can comprise, by way of example, information about a delivery identification, information about the delivery location, information about the delivery content and/or information about the probable delivery period.

The method further comprises obtaining 222 a piece of information about a response from the user of the mobile device to the notification about the authorization request from an input module. The response indicates whether or not the user consents to the authorization request. The input module, for example, an input module 28 of the apparatus 20, can correspond to or comprise, by way of example, a touch sensitive sensor, a microphone or a motion sensor. By way of example, the information about the response can comprise one or more positions of touches and/or touch sequences that correspond to graphical elements of the display of the output module 26. Alternatively or additionally, the information about the response can comprise a recording of spoken text or information about a movement gesture. By way of example, the output module, for example, the output module 26, and/or the input module, for example, the input module 28, may be comprised in a separate device, for example, in a smartwatch, and determining 230 can be performed in a smartphone.

By way of example, the output module 26 can correspond to a screen and the input module 28 can correspond to a touch sensitive sensor. The response can correspond, by way of example, to a position of a slide control in a visual depiction of the slide control, which can be implemented in a manner similar to 3002 and/or 3004 in FIG. 3.

Alternatively or additionally, the input module can comprise a microphone. The information about the response can comprise a recording of a voice command. Alternatively or additionally, the input module can comprise a motion sensor. The information about the response can correspond to a prescribed movement of the motion sensor, for example, a movement gesture.

In some exemplary embodiments, it may be possible for the vehicle (which can correspond to the mobile logistic destination 300) to be opened and started even without a key. One option in this case may be a slide control on a mobile phone. Other options are also conceivable in this case that detect the will of the user. Some exemplary embodiments can allow the command for unlocking the vehicle to be spoken into the smartwatch. It is also conceivable for unlocking to be able to be accomplished by moving the mobile device 200 (or the wrist) in a certain manner. The operator control action can connect the detection of the command to the identification of the user in this case—the spoken command could be coupled to the biometric identification of the user in the information about the response.

In some exemplary embodiments, the mobile device 200 may be designed to open the mobile logistic destination 300 based on an operator control action by the user (the recipient). An operator control action that is comprised in the information about the response can correspond, by way of example, to the operator control action that the recipient performs to open the mobile logistic destination 300. This means that, in exemplary embodiments, it is possible to make clear to the recipient that the transmission of the authorization is of similar seriousness to direct execution of the relevant command.

The method further comprises determining 230 the information about the authorization for opening the mobile logistic destination during the probable delivery period based on the authorization request and based on the information about the response. The determining 230 can comprise, by way of example, associating the touches with the corresponding graphical elements, or identification of voice commands in the spoken text. The determining 230 can further comprise providing, encrypting and/or signing a data packet that comprises the information about the authorization.

In at least some exemplary embodiments, the determining 230 can further comprise processing the information about the response, for example, based on a voice analysis or based on an association of points of the touch sensitive sensor or capacitive measurements of the touch sensitive sensor with operator control elements of a graphical user interface, which can be presented on the output module 26, for example. In at least some exemplary embodiments, the determining 230 can further comprise a signal analysis, for example, for transforming capacitive fluxes into operator control inputs, sound recordings into identified commands and/or movement gestures or tactile feedback into instructions of the user.

In some exemplary embodiments, the notification about the authorization request can further comprise a notification about an authentication request for the user. By way of example, the notification can comprise a piece of action information for the recipient, for example, a prompt to input a password or a PIN, or to place a finger onto a fingerprint scanner or to scan the eye using a retinal scanner. The information about the response can further comprise information about an authentication of the user. The authentication can correspond, by way of example, to a password, a PIN, a voice command, a fingerprint scan or a retinal scan. By way of example, the apparatus can comprise an authentication module 29, for example, a fingerprint scanner or retinal scanner, for authentication. Determining 230 the information about the authorization can further be based on the authentication of the user. By way of example, the determining 230 can comprise checking a password, a PIN, a fingerprint scan or a retinal scan, or user identification based on biometric recognition of speech for the voice command. By way of example, the authorization can be granted only if the authentication is successful.

The method further comprises providing 240 the information about the authorization. By way of example, the control module 24 is designed to provide the information about the authorization via the at least one interface 22. The providing 240 can correspond to providing the information about the authorization 240 for the central station 100.

In some exemplary embodiments, the method can further comprise obtaining 250 information about a revocation of the authorization from the input module. By way of example, the control module 24 may be designed to capture the information about the revocation via the input module, for example, in similar state to the information about the response as a position on a touch sensitive screen, as a spoken text or as a movement gesture. By way of example, the method can further comprise providing a user interface having an option for revocation of the authorization, the obtaining 250 being based on the option for revocation of the user interface. The information about the revocation can indicate that the user revokes the authorization for opening the mobile logistic destination during the probable delivery period. The method can further comprise providing 260 the information about the revocation of the authorization, for example, for the central station 100, for example, via the at least one interface 22. The providing 260 can further comprise, by way of example, processing the information about the revocation, for example, a transformation of raw data, similarly to method operation at 230. By way of example, the providing 260 can further comprise generating, signing and/or encrypting a data packet comprising the information about the revocation. In at least some exemplary embodiments, the information about the revocation of the authorization can further comprise information about an adapted authorization that replaces the previous information about the authorization. In some exemplary embodiments, the obtaining 250 can further comprise operations at 210-240 to determine the adapted authorization.

A further exemplary embodiment is a computer program for performing at least one of the methods described above when the computer program runs on a computer, a processor or a programmable hardware component. A further exemplary embodiment is also a digital storage medium that is machine-readable or computer-readable, and that has electronically readable control signals that can interact with a programmable hardware component such that one of the methods described above is performed.

The features disclosed in the description above, the claims below and the appended figures may be of importance, and can be implemented, both individually and in any combination for implementing an exemplary embodiment in their different configurations.

Although some embodiments have been described in connection with an apparatus, it goes without saying that these embodiments also represent a description of the corresponding method, so that a block or a component of an apparatus should also be considered as a corresponding method operation or as a feature of a method operation. Analogously to this, embodiments described in connection with or as a method operation also represent a description of a corresponding block or detail or feature of a corresponding apparatus.

Depending on particular implementation requirements, exemplary embodiments may be implemented in hardware or in software. The implementation can be performed using a digital storage medium, for example, a floppy disk, a DVD, a Blu-Ray disk, a CD, a ROM, a PROM, an EPROM, an EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an Application-Specific Integrated Circuit (ASIC), an Integrated Circuit (IC), a System on Chip (SOC), a programmable logic element or a Field Programmable Gate Array having a microprocessor (FPGA).

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is performed. At least one exemplary embodiment is a data storage medium (or a digital storage medium or a computer-readable medium) on which the program for performing one of the methods described herein is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable storage medium or data storage medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is performed, for example, by reading memory locations or writing a datum or multiple data thereto, as a result of which, if need be, switching processes or other processes are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and actuate other devices, machines and components.

The exemplary embodiments described above are merely an illustration of the principles of the disclosed embodiments. It goes without saying that modifications and variations of the arrangements and details described herein will become apparent to other persons skilled in the art. Therefore, the intention is to be restricted only by the scope of protection of the patent claims below, and not by the specific details that have been presented herein based on the description and the explanation of the exemplary embodiments.

LIST OF REFERENCE SYMBOLS

10 Apparatus for a central station
12 At least one interface
14 Control module
20 Apparatus for a mobile device
22 At least one interface
24 Control module
26 Output module
28 Input module
100 Central station
110 Obtain
112 Provide
114 Obtain
120 Obtain
122 Obtain
130 Determine
132 Compute
134 Compare
140 Determine
150 Provide
200 Mobile device of the recipient
210 Obtain
220 Provide
222 Obtain
230 Determine
240 Provide
250 Obtain
260 Provide
300 Mobile delivery destination
400 Mobile device of the delivery agent
2002 Mobile application
2004 Mobile application
3002 Display of the notification about the authorization request
3004 Information about the delivery request
3006 Slide control
3012 Display of overview of deliveries/scheduled accesses
3014 Overview of deliveries/scheduled accesses
3016 Authorizations granted
3018 Authorizations not granted

The invention claimed is:

1. A method for providing a lock control signal that unlocks a mobile logistic destination, wherein the lock signal is provided by a processor located at a central station, the method comprising:
obtaining information, from a mobile device of a delivery recipient, about a mobile logistic destination authorization to unlock the mobile logistic destination during a probable delivery period;
obtaining information about a lock enquiry and delivery agent location information from a mobile device of a delivery agent for the delivery;
obtaining logistic destination location information from the mobile logistic destination;
determining a delivery agent authorization for unlocking the mobile logistic destination based on the information about the lock enquiry and based on the information about the mobile logistic destination authorization;
computing a delivery agent location difference between the logistic destination location information and the delivery agent location information;
comparing a timestamp of the lock enquiry with the probable delivery period;
determining the lock control signal for the mobile logistic destination based on the delivery agent authorization, the delivery agent location difference and the comparison of the timestamp with the probable delivery period; and
providing the lock control signal for the mobile logistic destination in response to the delivery agent being authorized to unlock the mobile logistic destination, the delivery agent location difference satisfying a distance condition and the timestamp being within the probable delivery period.

2. The method of claim 1, wherein the information about the mobile logistic destination authorization is obtained before the information about the lock enquiry is obtained.

3. The method of claim 1, wherein the delivery agent location information corresponds to coordinates from a satellite-based positioning system, and wherein computing the delivery agent location difference is based on a comparison of the coordinates of the delivery agent location information with coordinates of the delivery destination location information.

4. The method of claim 1, further comprising obtaining information about a revocation of the mobile logistic destination authorization from the mobile device of the delivery recipient,
wherein the information about the revocation indicates that the delivery recipient has revoked the authorization for unlocking the mobile logistic destination during the probable delivery period, and
wherein the determining of the lock signal is further based on the information about the revocation and/or wherein the providing the lock signal is not performed in response to the mobile logistic destination authorization being revoked by the information about the revocation.

5. A mobile logistic delivery method involving a delivery recipient's mobile device and a mobile logistic destination using a processor located at a central station, the method comprising:
obtaining information about a mobile logistic destination authorization request response sent from the delivery recipient's mobile device in response to a notification about a delivery agent authorization request sent from a delivery agent's mobile device, wherein the mobile logistic destination authorization request response indicates whether the delivery recipient consents to the delivery agent authorization request;
determining information about a delivery agent authorization for unlocking the mobile logistic destination during a probable delivery period based on the delivery agent authorization request and the information about the mobile logistic destination authorization request response, wherein the delivery agent authorization is determined based on the information about a lock enquiry included in the delivery agent authorization request sent from the delivery agent's mobile device, information about the mobile logistic destination authorization sent from the delivery recipient's mobile device, and a delivery agent location difference between location information for the mobile logistic destination and the delivery agent location information;
comparing a timestamp of the lock enquiry with the probable delivery period; and
providing the information about the delivery agent authorization in response to the delivery agent being authorized to unlock the mobile logistic destination.

6. The method of claim 5, further comprising providing the notification about the delivery agent authorization request via a screen of the delivery recipient's mobile device,
wherein the obtaining of the information about the mobile logistic destination authorization request response sent from the delivery recipient's mobile device in response to the notification about the delivery agent authorization request is performed using a touch sensitive sensor, and
wherein the mobile logistic destination authorization request response corresponds to a position of a slide control in a visual depiction of the slide control, and/or
the delivery recipient's mobile device further comprises a microphone, wherein the information about the mobile logistic destination authorization request response comprises a recording of a voice command, and/or
the delivery recipient's mobile device further comprises a motion sensor, wherein the information about the mobile logistic destination authorization request response corresponds to a prescribed movement of the motion sensor.

7. The method of claim 6, wherein the notification about the delivery agent authorization request further comprises a notification about an authentication request to the delivery recipient, wherein the information about the mobile logistic destination authorization request response further comprises information about an authentication by the delivery recipient, and wherein the determining of the information about the mobile logistic destination authorization is further based on the authentication of the delivery recipient.

8. The method of claim 6, further comprising obtaining information about a revocation of the mobile logistic destination authorization from the input module, wherein the information about the revocation indicates that the delivery recipient has revoked the authorization for unlocking the mobile logistic destination during the probable delivery period.

9. A program having a program code for performing a method at a central station to provide a lock control signal for a mobile logistic destination in response to the program code being executed on a computer, or a processor at the central station, the method comprising:
obtaining information about a mobile logistic destination authorization for unlocking the mobile logistic destination during the probable delivery period from a mobile device of a delivery recipient;
obtaining information about a lock enquiry and delivery agent location information from a mobile device of a delivery agent for the delivery;
obtaining logistic destination location information from the logistic destination;
determining a delivery agent authorization for unlocking the mobile logistic destination based on the information about the lock enquiry and the information about the mobile logistic destination authorization;
computing a delivery agent location difference between the logistic destination location information and the delivery agent location information;
comparing a timestamp of the lock enquiry with the probable delivery period;
determining the lock control signal for the mobile logistic destination based on the delivery agent authorization, the delivery agent location difference and the comparison of the timestamp with the probable delivery period; and
providing the lock control signal for the mobile logistic destination in response to the delivery agent being authorized to unlock the mobile logistic destination, the delivery agent location difference satisfying a distance condition and the timestamp being within the probable delivery period.

10. The program of claim 9, wherein the information about the mobile logistic destination authorization is obtained before the information about the lock enquiry is obtained.

11. The program of claim 9, wherein the delivery agent location information corresponds to coordinates from a satellite-based positioning system, and wherein computing the delivery agent location difference is based on a comparison of the coordinates of the delivery agent location information with coordinates of the delivery destination location information.

12. The program of claim 9, wherein the method further comprises obtaining information about a revocation of the mobile logistic destination authorization from the mobile device of the delivery recipient,
wherein the information about the revocation indicates that the user has revoked the authorization for unlocking the mobile logistic destination during the probable delivery period, and wherein the determining of the lock signal is further based on the information about the revocation and/or wherein the providing the lock signal is not performed in response to the authorization being revoked by the information about the revocation.

13. An apparatus of a central station for providing a lock control signal for a mobile logistic destination, the apparatus comprising:
   at least one interface for communication with a mobile device of a recipient of a delivery, communication with the mobile logistic destination, and communication with a mobile device of a delivery agent for the delivery; and
   a processor for:
      obtaining information about a mobile logistic destination authorization for unlocking the mobile logistic destination during a probable delivery period from the mobile device of the delivery recipient via the at least one interface,
      obtaining information about a lock enquiry and delivery agent location information from the mobile device of the delivery agent for the delivery via the at least one interface,
      obtaining logistic destination location information from the mobile logistic destination via the at least one interface,
      determining a delivery agent authorization for unlocking the mobile logistic destination based on the information about the lock enquiry and based on the information about the mobile logistic destination authorization,
      computing a delivery agent location difference between the logistic destination location information and the delivery agent location information,
      comparing a timestamp of the lock enquiry with the probable delivery period,
      determining the lock control signal for the mobile logistic destination based on the authorization of the delivery agent, the delivery agent location difference and the comparison of the timestamp with the probable delivery period, and
      providing the lock control signal for the mobile logistic destination via the at least one interface in response to the delivery agent being authorized to unlock the mobile logistic destination, the delivery agent location difference satisfying a distance condition and the timestamp being within the probable delivery period.

14. The apparatus of claim 13, wherein the information about the mobile logistic destination authorization is obtained before the information about the lock enquiry is obtained.

15. The apparatus of claim 13, wherein the delivery agent location information corresponds to coordinates from a satellite-based positioning system, and wherein computing the delivery agent location difference is based on a comparison of the coordinates of the delivery agent location information with coordinates of the delivery destination location information.

16. The apparatus of claim 13,
   wherein information about a revocation of the mobile logistic destination authorization is obtained from the mobile device of the delivery recipient,
   wherein the information about the revocation indicates that the user has revoked the mobile logistic destination authorization for unlocking the mobile logistic destination during the probable delivery period, and
   wherein the determination of the lock signal is further based on the information about the revocation and/or the providing lock signal is not performed in response to the mobile logistic destination authorization being revoked by the information about the revocation.

17. A mobile device associated with a delivery recipient, the mobile device comprising:
   at least one interface for communication with a processor at a central station; and
   a processor for sending information about a mobile logistic destination authorization request response from the delivery recipient's mobile device in response to a notification about a delivery agent authorization request, wherein the mobile logistic destination authorization request response indicates whether the delivery recipient consents to the delivery agent authorization request,
   wherein information about a delivery agent authorization for unlocking the mobile logistic destination during the probable delivery period is determined by the processor at the central station based on the delivery agent authorization request and on the information about the mobile logistic destination authorization request response,
   wherein the delivery agent authorization is based on the information about a lock enquiry from a mobile device of a delivery agent for the delivery to the delivery recipient via the at least one interface, the mobile logistic destination information about the authorization, and a delivery agent location difference between location information for the mobile logistic destination and delivery agent location information provided by the mobile device of the delivery agent, and
   wherein the information about the delivery agent authorization is provided via the at least one interface of the delivery recipient's mobile device.

18. The mobile device of claim 17, wherein the notification about the delivery agent authorization request is provided via a screen of delivery recipient's mobile device,
   wherein the obtaining of the information about the mobile logistic destination authorization request response sent from the delivery recipients mobile device in response to the notification about a delivery agent authorization request is performed using a touch sensitive sensor, and
   wherein the mobile logistic destination authorization request response corresponds to a position of a slide control in a visual depiction of the slide control, and/or
   the delivery recipient's mobile device further comprises a microphone, wherein the information about the authorization response comprises a recording of a voice command, and/or
   the delivery recipient's mobile device further input modulo comprises a motion sensor, wherein the information about the authorization response corresponds to a prescribed movement of the motion sensor.

19. The apparatus of claim 18, wherein the notification about the delivery agent authorization request further comprises a notification about an authentication request to the delivery recipient, wherein the information about the mobile logistic destination authorization request response further comprises information about an authentication by the delivery recipient, and wherein the determining the information about the mobile logistic destination authorization is further based on the authentication of the delivery recipient.

20. The apparatus of claim 18, wherein information about the revocation of the mobile logistic destination authorization is obtained from the delivery agent's mobile device, wherein the information about the revocation indicates that the user has revoked the mobile logistic destination authorization for unlocking the mobile logistic destination during the probable delivery period.

21. A program having a program code for facilitating a mobile logistic delivery method using a processor located at a central station, the method comprising:
  obtaining information about a mobile logistic destination authorization request response sent from a delivery recipient's mobile device in response to a notification about a delivery agent authorization request, wherein the mobile logistic destination authorization request response indicates whether the delivery recipient consents to the delivery agent authorization request;
  determining information about a delivery agent authorization for unlocking the mobile logistic destination during a probable delivery period based on the delivery agent authorization request and on the information about the mobile logistic destination authorization request response,
  wherein the delivery agent authorization is based on information about a lock enquiry from a mobile device of a delivery agent for the delivery to the delivery recipient via the at least one interface, the information about the mobile logistic destination authorization, and a delivery agent location difference between location information for the mobile logistic destination and delivery agent location information provided by the mobile device of the delivery agent; and
  wherein the information about the delivery agent authorization is provided via the delivery recipient's mobile device.

* * * * *